United States Patent [19]

Sibley et al.

[11] 4,162,776
[45] Jul. 31, 1979

[54] AERIAL PHOTOGRAPHY CAMERA MOUNT ASSEMBLY FOR A HELICOPTER

[76] Inventors: Clarence E. Sibley, HQ26TRW, Box 1331, APO New York, N.Y. 09860; Francisco C. Sablan, 13 Woodland Dr., Mary Esther, Fla. 32569

[21] Appl. No.: 877,936

[22] Filed: Feb. 15, 1978

[51] Int. Cl.² .............................................. B64D 47/08
[52] U.S. Cl. .................................. 244/118 R; 354/74
[58] Field of Search ............. 244/129.1, 129.5, 118 R, 244/137 R, 1 R, 136; 354/65, 74, 81, 113, 293, 294, 70; 89/37.5 R, 37.5 A, 37.5 D, 37.5 E; 33/1 A; 248/178, 187, 23, 346; 95/12.5

[56] References Cited

U.S. PATENT DOCUMENTS

| | | | |
|---|---|---|---|
| 2,506,095 | 5/1950 | Mamtz | 354/74 |
| 2,842,026 | 7/1958 | Reese et al. | 354/293 |
| 3,421,721 | 1/1969 | Miller | 354/74 |
| 3,823,901 | 7/1974 | Holmes et al. | 244/118 R |
| 3,897,829 | 8/1975 | Eason | 244/136 |
| 4,044,364 | 8/1977 | Prinzo | 354/74 |
| 4,114,839 | 9/1978 | Sibley et al. | 244/118 R |

*Primary Examiner*—Galen L. Barefoot
*Attorney, Agent, or Firm*—Joseph E. Rusz; Arsen Tashjian

[57] ABSTRACT

An assembly for mounting, supporting, and releasably holding an angularly adjustable aerial photography camera that is to be used to take aerial reconnaissance photographs, while the assembly is detachably connected to the internal surface of a helicopter that is in stable flight and has an opening in each side. The assembly includes: a rectangular frame which carries the camera; another rectangular frame which carries ballast (i.e., a counterweight); and, a main frame to which the rectangular frames are releasably connected, and in which the frames are slidably movable in opposite directions simultaneously. In flight, the rectangular frames are simultaneously extended on each side of the center of gravity, and of the longitudinal centerline, of the helicopter, and through the opposite openings in the helicopter, with the camera extending out of one of the openings, and with the counterweight extending out of the other opening. This symmetrical loading, and the resultant continued stability of the helicopter in flight, permit the taking of the aerial photographs with the camera.

8 Claims, 17 Drawing Figures

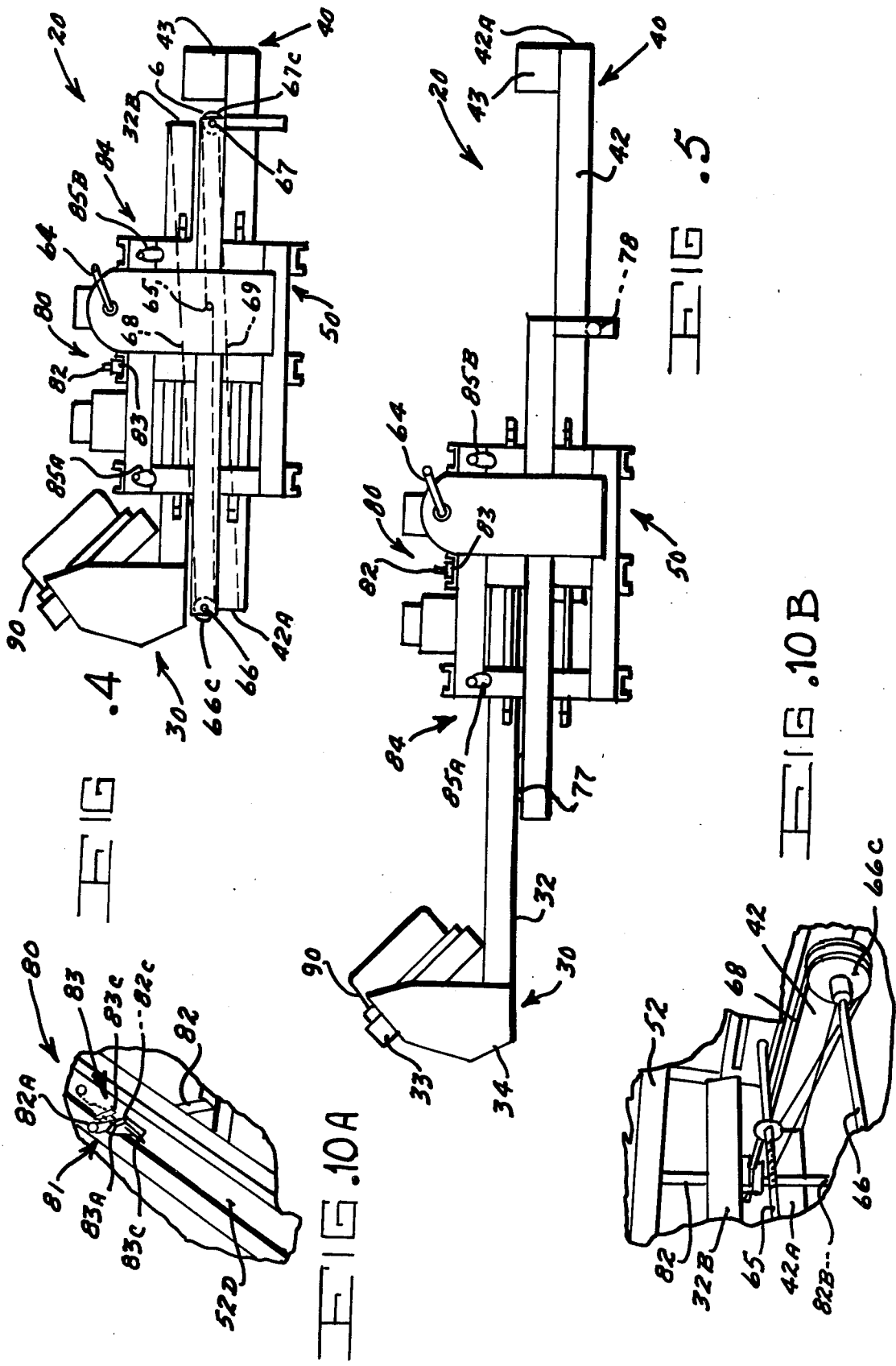

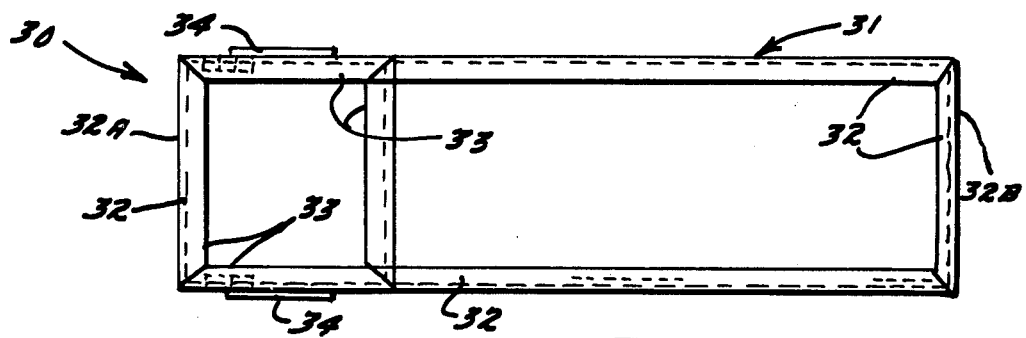
FIG.6B
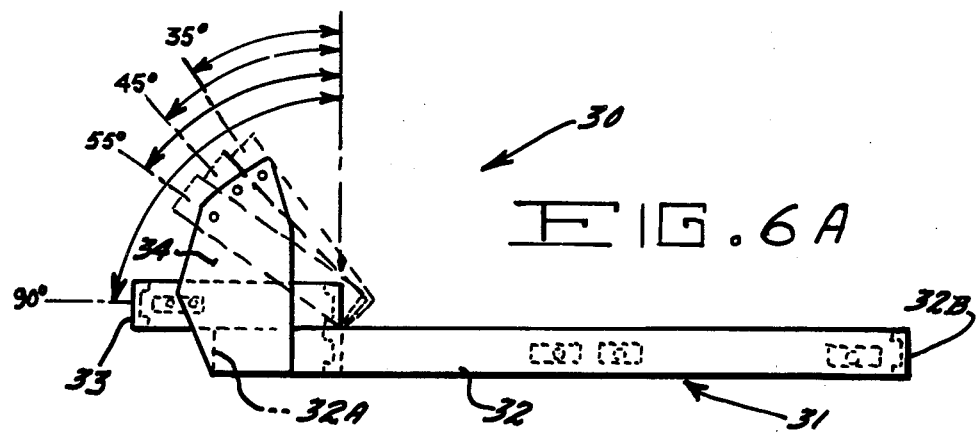
FIG.6A
FIG.8C
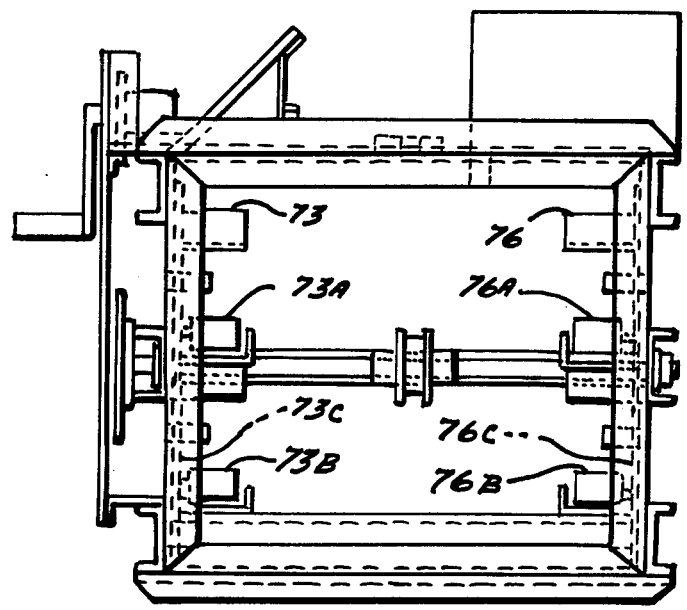

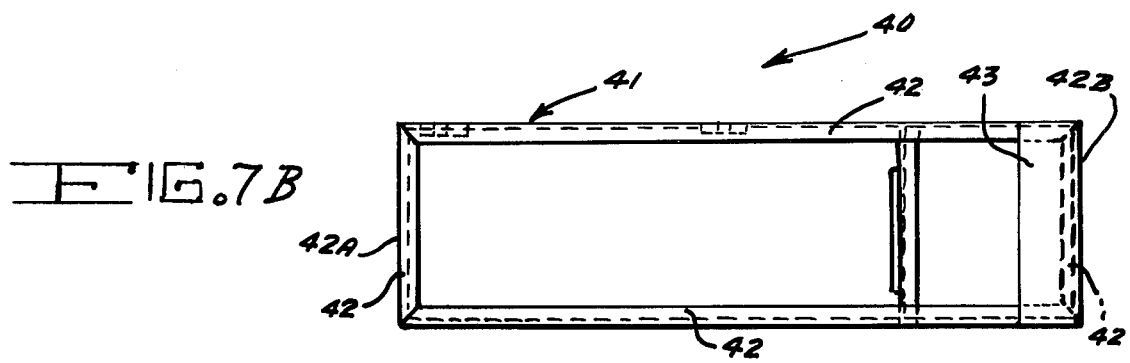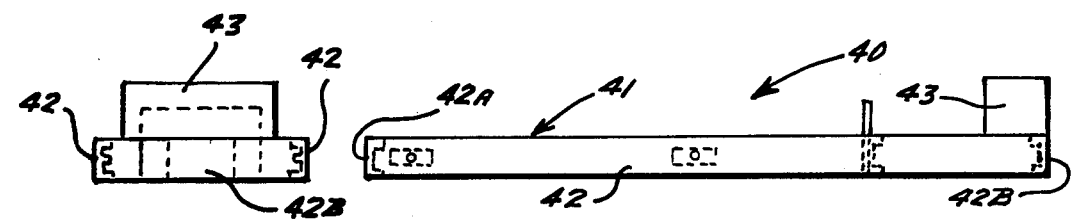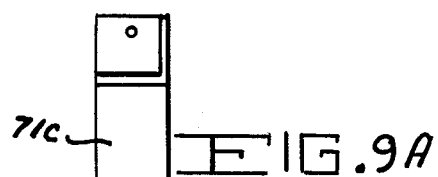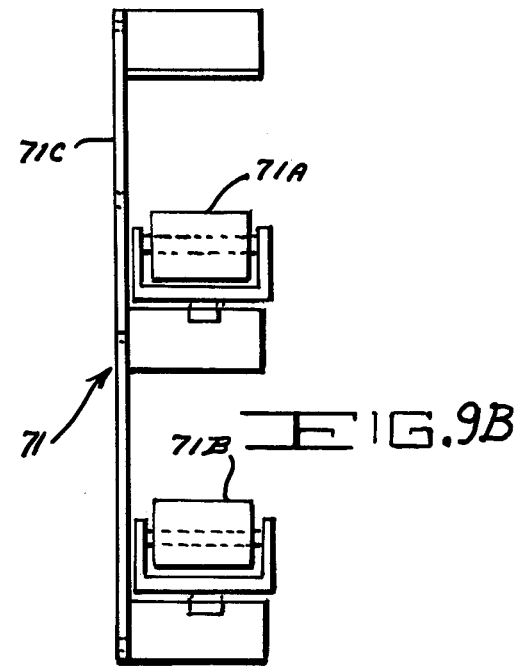

AERIAL PHOTOGRAPHY CAMERA MOUNT ASSEMBLY FOR A HELICOPTER

STATEMENT OF GOVERNMENT INTEREST

The invention described herein may be manufactured and used by or for the Government for governmental purposes without the payment of any royalty thereon.

CROSS REFERENCE TO RELATED APPLICATION

The inventive camera mount assembly taught herein is related in general subject matter to U.S. Pat. No. 4,114,839, filed on Aug. 19, 1977, and entitled "Aerial Photograph Camera Mount," in that one of the assemblies described therein to hold an aerial photograph camera in an oblique position can be utilized, or can be adapted to be utilized, in this camera mount assembly.

BACKGROUND OF THE INVENTION

This invention relates generally to aerial photography and more particularly, to a novel assembly which permits the taking of aerial (reconnaissance) photographs from a helicopter in flight.

In aerial photographs of the type needed in reconnaissance, aerial photography cameras are mounted in the aircraft on mounts that are fixedly positioned in predetermined locations in the aircraft to provide maximum coverage of the ground below. In this regard, it is fair and accurate to say that aerial photography aircraft are built primarily to accomplish aerial photography, or are extensively modified to accomplish that purpose, with the "trade-off" resulting in a significant lessening of the capability to perform the functions for which the aircraft was built originally.

In the military establishment an urgent need has arisen to use a helicopter (i.e., the UH-1N) to take high quality aerial reconnaissance photographs, without adversely affecting the other mission capabilities of the helicopter, and without "missionizing" the helicopter by extensive modifications, and most importantly, without adversely affecting the sensitive stability of the helicopter in flight.

We have invented a unique aerial photography camera mount assembly that fulfills this need; and, thereby, we have significantly advanced the state-of-the-art.

SUMMARY OF THE INVENTION

This invention pertains to a novel aerial photography camera mount assembly, adapted for use in taking aerial reconnaissance photographs with an aerial photograph camera extending from a helicopter having a starboard side with an opening therein, a port side with an opening therein, a horizontal planar internal surface located between these openings, a plurality of tiedown rings affixed to this horizontal internal surface, and a center of gravity located within this horizontal internal surface and having a longitudinal axis and a transverse axis that intersect, are perpendicular to each other, and are coplanar with the horizontal internal surface, and with this transverse axis situated between and aligned with the starboard and port side openings.

Accordingly, the principal object of this invention is to teach the structure of such a unique aerial photography camera mount assembly for a helicopter.

This principal object, as well as other related objects, of this invention will become readily apparent after a consideration of the description of the invention, together with reference to the Figures of the drawings.

DESCRIPTION OF THE DRAWINGS

FIG. 4 is a side elevation view, in simplified pictorial and schematic form, of a preferred embodiment of the invention in the retracted position;

FIG. 5 is also a side elevation view, in simplified pictorial and schematic form, of the preferred embodiment of the invention shown in FIG. 4 in the fully extended position;

FIGS. 6A and 6B are, respectively, a side elevation view and a top plan view, in simplified form, both in pictorial and schematic form, of a major constituent subassembly (i.e., a means for mounting, supporting, and releasably holding an aerial photography camera) of the preferred embodiment shown in FIGS. 4 and 5;

FIGS. 7A, 7B and 7C are, respectively, a side elevation view, a top plan view, and an end view, in simplified form, both in pictorial and schematic form, of another major constituent subassembly (i.e., a means for counterbalancing the weight of the subassembly shown in FIGS. 6A and 6B and of an aerial photography camera mounted thereon) of the preferred embodiment shown in FIGS. 4 and 5;

FIGS. 8A, 8B and 8C are, respectively, a side elevation view, a top plan view, and an end view, in simplified form, both in pictorial and schematic form, of still another major constituent subassembly (i.e., an adapter means for removably holding, detachably interconnecting, and slidably moving simultaneously the subassemblies shown in FIGS. 6A, 6B, 7A, 7B and 7C) of the preferred embodiment shown in FIGS. 4 and 5;

FIGS. 9A and 9B are, respectively, a side elevation view and an end view, in simplified form, both in pictorial and schematic form, of a representative one of a plurality of roller bar subassemblies that are constituent components of the adapter means shown in FIGS. 8A, 8B, and 8C; and FIGS. 10A and 10B are diverse views, in perspective, in simplified form and partially fragmented, showing yet another major constituent component (i.e., a means for preventing the inadvertent jettisoning of the subassemblies shown in FIGS. 6A, 6B, 7A, 7B and 7C) of the preferred embodiment shown in FIGS. 4 and 5, and also showing some components of the adapter means shown in FIGS. 8A, 8B and 8C.

DESCRIPTION OF THE PREFERRED EMBODIMENT

Figure 1:
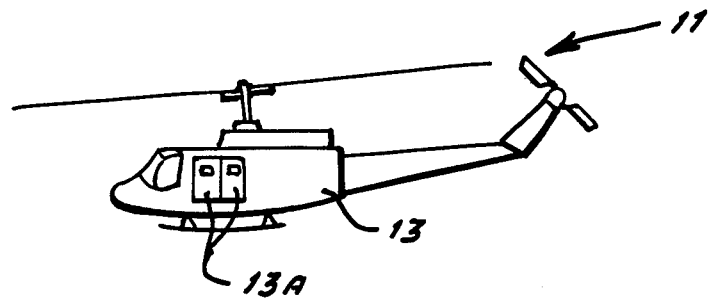
FIG. 1 is a side elevation view, in simplified form, both pictorial and schematic, of the helicopter with which our inventive camera mount assembly is to be used.
Figure 2:
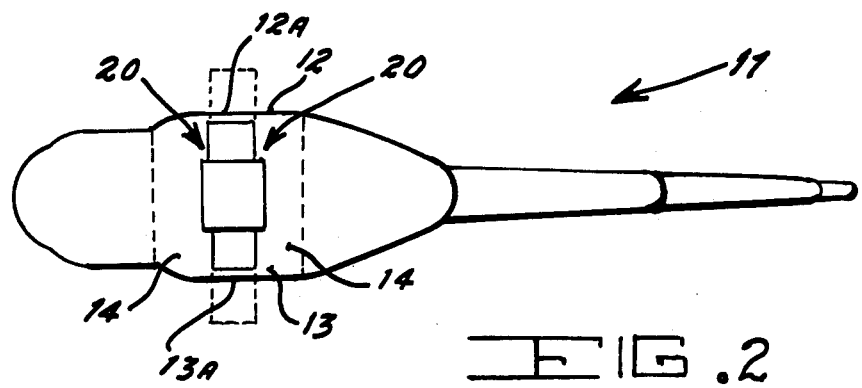
FIG. 2 is a top plan view, in simplified outline form, of the helicopter shown in FIG. 1, without the rotors to maintain simplicity of the drawing, showing in phantom the inventive mount, in schematic form, in the environment in which it is to be used.
Figure 3:
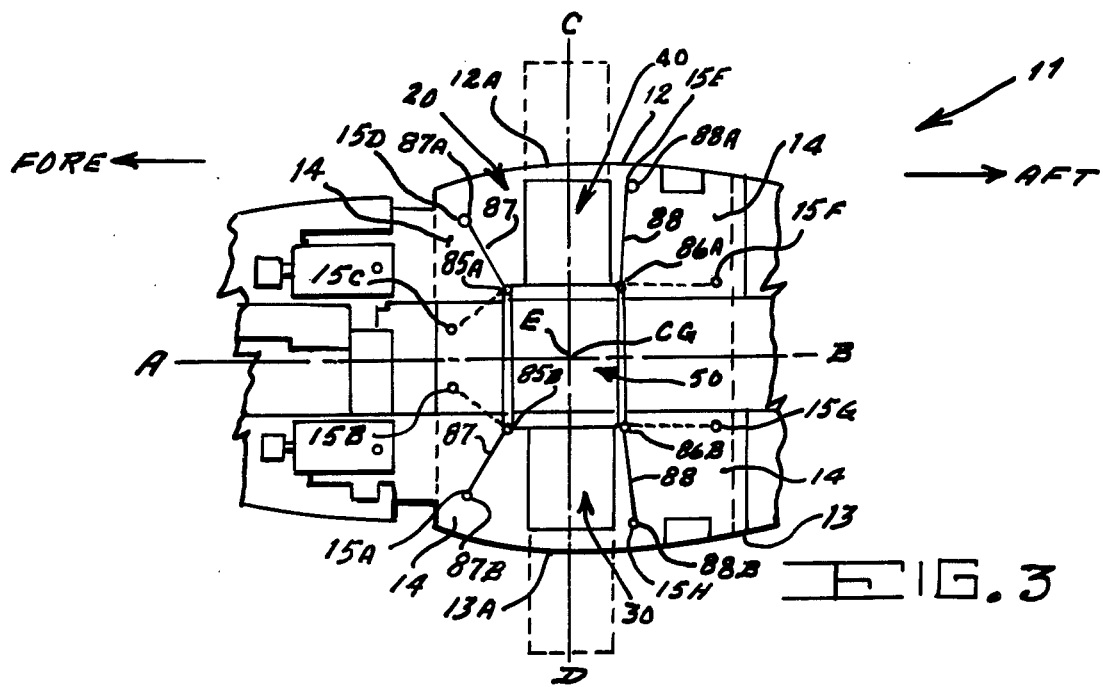
FIG. 3 is an enlarged, partially fragmented portion of FIG. 2.

As a preliminary matter, and with reference to Figures 1–3, inclusive, therein are shown various and diverse views of the helicopter 11 with which our inventive aerial photography camera mount assembly 20 is to be used. More specifically, the helicopter 11 has a starboard (i.e., right) side 12 with and opening 12A therein, a port (i.e., left) side 13 with an opening 13A therein, a planar horizontal internal surface, generally designated 14 and indicated by phantom lines, therein located between the openings 12A and 13A, a first plurality of cargo tiedown rings, such as 15A, 15B, 15C, 15D, 15E, 15F, 15G, and 15H, that are affixed to this horizontal portion 14, and a center of gravity, designated "CG," that is location in portion 14 and that has a longitudinal (i.e., horizontal) axis, designated "A-B" and a transverse axis, designated "C-D." These axes, "A-B" and "C-D" intersect at "CG"). The axes also are perpendicular to each other; and, are coplanar with each other and with horizontal internal surface 14. Additionally, transverse axis "C-D" is situated between, and is aligned with, the starboard and port side openings 12A and 13A.

It is here to be noted that our assembly is, of course, also to be used with an aerial photography camera (not shown here, but to be shown later) that is loaded with film, and that both the camera and the film have weight. Accordingly, the term "camera" as used herein is intended to means such a camera, as is described above, that is loaded with the appropriate film.

With reference to FIGS. 4 and 5 therein are shown side elevation views of a preferred embodiment 20 of our invention in, respectively, the retracted position and fully extended position.

In its most basic and generic form, our invention 20, comprises: a first means, generally designated 30, for mounting, supporting, and releasably holding an aerial photography camera (such as is designated 90) in an angularly adjustable position, with of course this first means 30 having weight, and the camera 90 (i.e., as previously defined herein, the camera and the appropriate film (not shown) with which it is loaded) also having weight; a second means, generally designated 40 and operatively associated with the first means 30, for counterbalancing the combined weight of the fist means 30 and of the film-loaded camera 90 that is mounted, supported, and releasably held by the first means 30; a third means, generally designated 50 and operatively associated with the first means 20 and the second means 30, for removably holding the first and second means in parallel, equal spaced-apart relationship, and for detachably interconnecting the first and second means, and also for slidably moving simultaneously the first and second means in diametrically opposed (i.e., opposite) directions, with this third means 50 positioned on the horizontal internal surface 14, FIGS. 2 and 3, of the helicopter 11, and also centrally located oer the center of gravity "CG," FIG. 3, and the intersection "E," FIG. 3, of the transverse axis "C-D" and the longitudinal axis "A-B," and additionally releasably attached to some of the first plurality of cargo tiedown rings, such as 15A–15H, inclusive, FIG. 3; and, a fourth means, generally designated 80 and that is releasably connected to the third means 40 and also is in selective cooperative engagement with the first means 30 and the second means 40, for preventing inadvertent jettisoning of the first means 30, of the film-loaded camera 90 releasably held by the first means 30, and of the third means 40, from the helicopter 11.

Now, with reference to FIGS. 6A and 6B, shown therein are various views of the first means 30 for mounting, supporting, and releasably holding the film-loaded camera 80 in an angularly adjustable position. This means 30 includes a first subassembly 31 which comprises: a first frame member 32, essentially rectangular in shape, having a first end 32A and a second end 32B and, of course, weight; a box section, generally designated 33, hingedly attached to the first frame member 32, near the first end 32A of it 32; and, a fifth means 34, adjacent to the box section 33 and attached to the first frame member 32 at the first end 32A, for selectively varying the angularity of the film-loaded camera 70 in relation to the first frame member 32.

With reference to FIGS. 7A, 7B and 7C, therein is shown the second means 40 for counterbalancing the weight of the first means 30 and the weight of the film-loaded camera 80 that is releasably held by the first means 30. This means 40 includes a second subassembly 41 which comprises: a second frame member 42, essentially rectangular in shape, having weight, a first end 42A, and a second end 42B, with this second frame member positioned in parallel, equal-spaced-apart relationship to the first frame member 32 of the first subassembly 31, as shown in FIGS. 4 and 5; and, a counterweight 43 attached to the second frame member 42 at the second end 42B. The combined weight of this second means 40 equals the combined weight of the first means 30 and of the camera 90 releasably mounted on it 30.

Figure 8A:
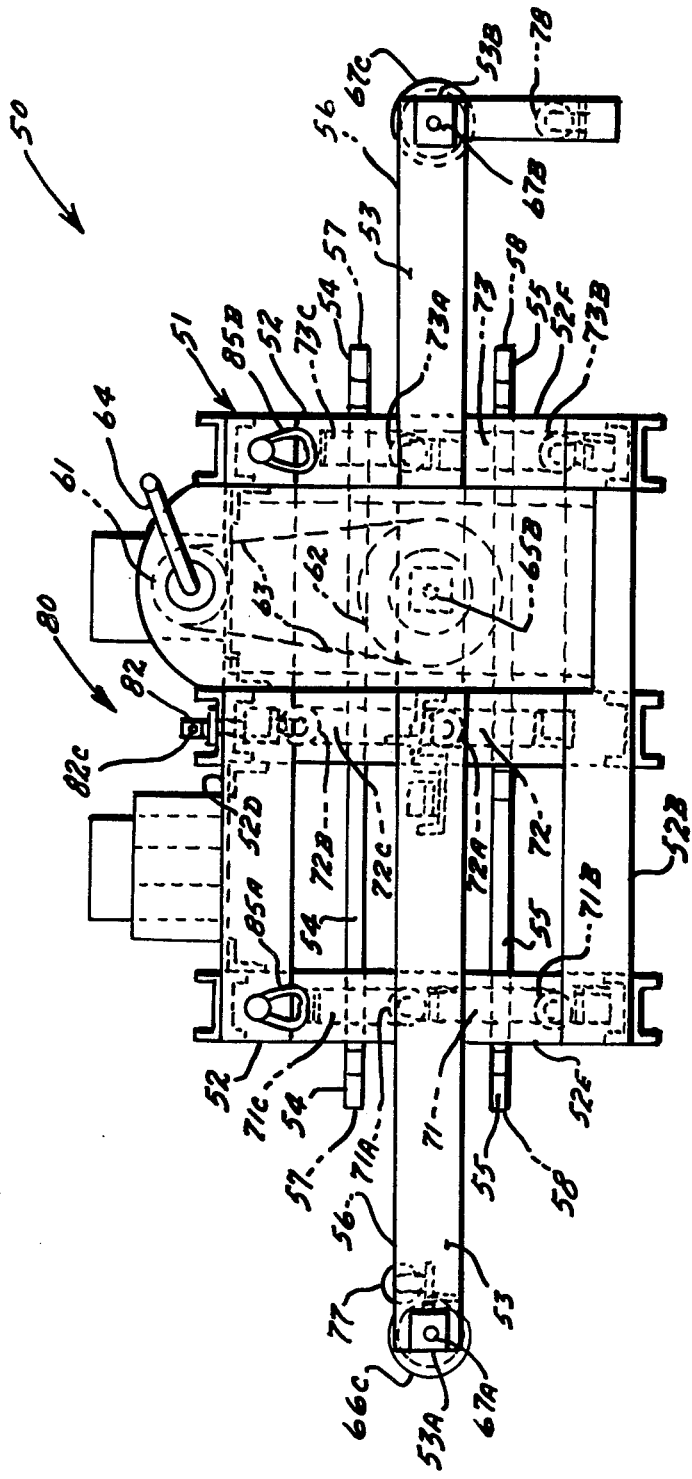
Figure 8B:
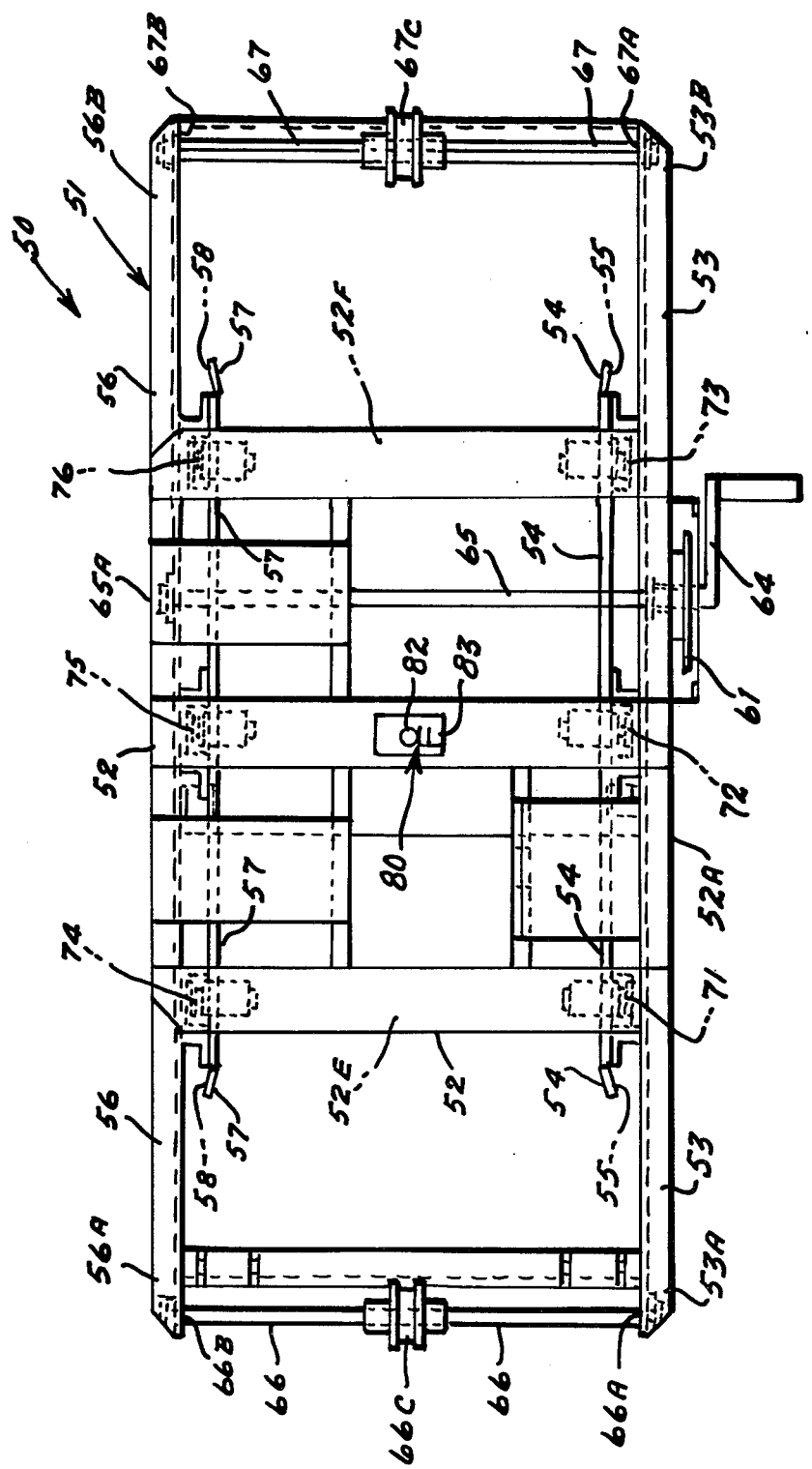

Now, with reference to FIGS. 8A, 8B and 8C, therein are shown various views of the third means 50 for removably holding the first means 30 and the second means 40 in parallel, equal spaced-apart relationship, and for detachably interconnecting the first means 30 and the second means 40, and also for slidably moving simultaneously the first means 30 and the second means 40 in diametrically opposed (i.e., opposite) directions. This means 50 includes a third subassembly 51 which comprises: a third member 52, essentially box-like in shape and hollow, having a front vertical surface 52A, a lower horizontal surface 52B connected to the front vertical surface 52A, a rear vertical surface 52C parallel to the front vertical surface 52A and connected to the lower horizontal surface 52B, an upper horizontal surface 52D parallel to the lower horizontal surface 52B and connected to the rear vertical surface 52C and to the front vertical surface 52A, an open first end 52E, and an open second end 52F; a first transverse horizontal support member 53 attached to and extending beyond the front vertical surface 52A of the third frame member 52, with this support member 53 having a first end 53A and a second end 53B; a first and a second transverse horizontal guide members, 54 and 55, that are positioned, respectively, above and below the first transverse horizontal support member 53, and are attached to the front vertical surface 52A of the third frame member 52, with these horizontal guide members 54 and 55 parallel to, and equally spaced-apart from, the first transverse horizontal support member 53; a second transverse horizontal support member 56 attached to and extending beyond the rear vertical surface 52C of the third frame member 52, with this support member having a first end 56A and a second end 56B; a third and a fourth transverse horizontal guide members 57 and 58 positioned, respectively, above and below the second transverse horizontal support member 56, and attached to the rear vertical surface 52C of the third frame member 52, with the third and fourth transverse horizontal guide members 57 and 58 parallel to, and equally spaced-apart from, the second transverse horizontal support member 56; an upper sprocket 61 rotatably attached to the upper horizontal surface 54D of the third frame member 52; a lower sprocket 62 rotatably attached to the front vertical surface 52A of the third frame member 52; an endless chain 63 in engagement with the upper and lower sprockets 61 and 62; a crank handle 64 rotatably connected to the upper sprocket 61; a driven shaft 65 having a first and a second end 65A and 65B, with the first end 65A rotatably connected to the lower sprocket 62, and with the second end 65B rotatably connected to the rear vertical surface 52C of the third frame member 52; a first idler shaft 66 having a first end 66A, a second end 66B, and a first idler pulley 66C on the shaft 66 and located between the first and second ends 66A and 66B, with the first end 66A rotatably connected to the first end 53A of the first transverse horizontal support member 53, and with the second end 66B rotatably connected to the first end 56A of the second transverse horizontal support member 56; and, a second idler shaft 67 having a first end 67A, a second end 67B, and a second idler pulley 67C on the shaft 67 and located between the first and second ends 67A and 67B, with the first end 67A rotatably connected to the second end 53B of the first transverse horizontal support member 53, and with the second end 67B rotatably connected to the second end 56B of the second transverse horizontal support member.

As shown in FIGS. 4 and 10B, the third subassembly 51 of third means 50 further comprises: a first cable means 68 interconnecting the driven shaft 65, the first idler pulley 66C on first idler shaft 66, and the second end 32B of the first frame member 32 of the first subassembly 31; and, a second cable means 69 interconnecting the driven shaft 65, the second idler pulley 67C and the first end 42A of the second frame member 42 of the second subassembly 41.

With reference to FIGS. 9A and 9B in conjunction with reference to FIGS. 8A, 8B and 8C, the third subassembly 51 of the third means 50 also further comprises: a first plurality of roller bars, such as 71, 72 and 73, attached in a vertical position to the front vertical surface 52A of the third frame member 52, and internal of that surface 52A with each one of the roller bars of this plurality, such as the representative one in FIGS. 9A and 9B, being identical and comprising two spaced-apart, horizontally disposed rollers, such as 71A and 71B, rotatably attached to a bar, such as 71C, with at least one of the bars, preferably the center disposed bar (such as 72C) being in an inverted condition, with this plurality of roller bars also including rollers 72A and 72B and bar 72C, and rollers 73A and 73B and bar 73C; a second plurality of roller bars, such as 74, 75 and 76, attached in a vertical position to the rear vertical surface 52C of the third frame member 52, and internal of that surface 52C, with each one of the second plurality of roller bars 74, 75 and 76 identical to each one of the first plurality of roller bars 71, 72 and 73, and with at least one of the second plurality of bars, preferably the center disposed bar (preferably 75C) being in an inverted condition, with this plurality of roller bars also including rollers 74A and 74B and bar 74C, rollers 75A and 75B and bar 75C, and rollers 76A and 76B and bar 76C; a first roller support means 77 (see also FIG. 5) attached to and disposed above the first end 53A of the first transverse horizontal support member 53, and also dipsosed under first frame member 32; and, a second roller support means 78 (see also FIG. 5) attached to and disposed below second end 53B of the first transverse horizontal support member 53, and also disposed under second frame member 42.

Now, with reference to FIGS. 10A and 10B, therein are shown various views of the fourth means 80 for preventing inadvertent jettisoning of the first means 30, and of the film-loaded camera 90 that is releasably held by the first means 30, and also of the second means 40 from the helicopter 11. This means 80 (also shown in FIGS. 4, 5, 8A and 8B) includes a fourth subassembly 81 which comprises: a locking rod 82 having a first end 82A, a second end 82B, an opening 82C in and through the first end 82A, with the rod 82 positioned vertically and passing through the upper horizontal surface 52D of the third frame member 52, and passing through the first frame member 32, near the second end 32B of that member 32, and also passing through the second frame member 42, near the first end 42A of that member 42; and, a sixth means 83 for releasably locking the locking rod 82 in place, with this means 83 including: an abutment bar 83A, attached to the upper horizontal surface 52D of the third frame member 52, that has an opening 83B (in and through the bar 83A) which is in registration with the opening 82C in and through the first end 82A of the locking rod 82; and, a locking pin 83C that is removably inserted into, and passes through, the opening 82C in the locking rod 82 and the opening 83C in the abutment bar 83A.

Returning to FIG. 3, therein is shown a seventh means, generally designated 84, for releasably attaching the third means 50 to some of the first plurality of cargo rings (such as 15A–15H, inclusive) that are affixed to the horizontal internal surface 14 of the helicopter 11. This means 84 includes: a second plurality of cargo tiedown rings, such as 85A and 85B, FIGS. 3, 4, 5 and 8A, affixed to the front vertical surface 52A of the third frame member 52 of the third means 50; a third plurality of cargo tiedown rings, such as 86A and 86B, that are affixed to the rear vertical surface 52C of the third frame member 52 of the third means 50; a first cargo tiedown strap 87, of predetermined length and passing through the second plurality of cargo tiedown rings 85A and 85B, having a first end 87A and a second end 87B, with the first end 87A releasably connected to one of the first plurality of cargo tiedown rings, such as 15D, and with the second end 87B releasably connected to another one of the first plurality of cargo tiedown rings, such as 15A; and, a second cargo tiedown strap 88, of predetermined length and passing through the third plurality of cargo tiedown rings 86A and 86B, having a first end 88A and a second end 88B, with the first end 88A releasably connected to one of the first end 88A releasably connected to one of the first plurality of cargo tiedown rings, such as 15E, and with the second end 88B releasably connected to another one of the first plurality of cargo tiedown rings, such as 15H.

As a matter of preference, and not of limitation, the first subassembly 31 of the first means 30, the second subassembly 41 of the second means 40, the third subassembly 51 of the third means 50, the fourth subassembly 81 of the fourth means 80, and the third and fourth plurality of cargo tiedown rings (such as, respectively, 85A and 85B, and 86A and 86B) of the seventh 84 means are all made of metal.

Additionally, also as matters of preference, and not of limitation: the first plurality of roller bars (such as 71, 72 and 73, FIGS. 8A and 8B) and three in number; the second plurality of roller bars (such as 74, 75 and 76, FIG. 8B) are also three in number; the second plurality of cargo tiedown rings (such as 85A and 85B, FIGS. 3, 4, 5 and 8A) are two in number; and, the third plurality of cargo tiedown rings (such as 86A and 86B) are also two in number.

MANNER OF OPERATION OF THE PREFERRED EMBODIMENT

The manner of operation of the preferred embodiment 20 of our invention can be very easily ascertained by any person of ordinary skill in the art from the foregoing detailed description, coupled with reference to the Figures of the drawings.

For others, it is sufficient to say that, when it is desired to take an aerial photograph (either vertical or oblique) by using our invention 20 in the described helicopter 11 when it is in flight, the camera 90 is properly set angularly; the starboard and port side doors, if any, of the helicopter 11 are opened, exposing the starboard opening 12A and the port opening 13; the crank 64, FIGS. 4, 5, 8A and 8B is appropriately turned, resulting in the simultaneous deployment of the first means 30 (with camera 90), and of the second means 40 (with the counterweight or ballast 43), to opposite sides of the center of gravity "CG," FIG. 3, and of the longitudinal axis "A-B" of the helicopter 11, thereby maintaining symmetrical loading and stability of the helicopter 11 in flight. To prevent the inadvertent jettisoning of the first and second means 30 and 40 from the helicopter 11, the fourth means 80 is used, i.e., the locking rod 82 is passed through the third frame member 52, and through the extended first frame member 32 and the extended second frame member 42, where these members 32 and 42 overlap, and the locking pin 83C is inserted into and through the rod 82 and the abutment bar 83A. The photograph(s) is (are) taken, as necessary or as desired. When the taking of the photograph(s) is completed, the above-described procedure is reversed.

CONCLUSION

It is abundantly clear from all of the foregoing, and from the Figures of the drawings, that the stated principal object, as well as other related objects, of our invention have been achieved.

It is to be noted that, although there have been described the fundamental and unique features of our invention as applied to a preferred embodiment, various other embodiments, variations, adaptations, substitutions, additions, omissions, and the like may occur to, and can be made by, those of ordinary skill in the art, without departing from the spirit of our invention. For example, four cargo tiedown straps, rather than two, may be used to releasably attach the third frame member 52 of third means 50 to the internal surface 14 of the helicopter 11, as shown in phantom in FIG. 3.

What is claimed is:

1. An aerial photography camera mount assembly, adapted for use with an aerial photography camera having weight, and with a helicopter having a starboard side with an opening therein, a port side with an opening therein, a planar horizontal internal surface located between said openings, a first plurality of cargo tiedown rings affixed to said horizontal internal surface, and a center of gravity located in said horizontal surface and having a longitudinal axis and a transverse axis that intersect and from an intersection, that are perpendicular to each other, and that are coplanar with said horizontal internal surface, and wherein said transverse axis is situated between and aligned with said starboard and port side openings, comprising:
   a. a first means for mounting, supporting, and releasably holding said camera in an angularly adjustable position, with said first means having weight;
   b. a second means, operatively associated with said first means, for counterbalancing said weight of said first means, and said weight of said camera that is mounted, supported, and releasably held by said first means;
   c. a third means, operatively associated with said first and second means, for removably holding said first and second means in parallel, equal spaced-apart relationship, and for detachably interconnecting said first and second means, and also for slidably moving simultaneously said first means and said second means in diametrically opposed directions, with said third means positioned on said horizontal internal surface of said helicopter, and also centrally located over said center of gravity and said intersection of said transverse and longitudinal axes, and additionally releasably attached to some of said first plurality of cargo tiedown rings;
   d. and, a fourth means, releasably connected to said third means, and in selective cooperative engagement with said first means and said second means, for preventing inadvertent jettisoning of said first means, of said camera releasably held by said first means, and of said second means, from said helicopter;
      whereby when said helicopter is in stable flight, and said first means with said releasably held camera are extended and are retracted through one of said side openings in said helicopter, and said second means is extended and is retracted through said other of said openings in said helicopter, said center of gravity and said horizontal and transverse axes remain in a stable condition, and said helicopter remains in stable flight.

2. An aerial photography camera mount assembly, as set forth in claim 1, wherein said first means for mounting, supporting, and releasably holding said camera in an angularly adjustable position includes a first subassembly which comprises:
   a. a first frame member, essentially rectangular in shape, having weight, a first end, and a second end;
   b. a box section hingedly attached to said first frame member near said first end thereof;
   c. and, a fifth means, adjacent said box section and attached to said first frame member at said first end thereof, for selectively varying the angularity of said first frame member.

3. An aerial photography camera mount assembly, as set forth in claim 2, wherein said second means for counterbalancing said weight of said first means, and said weight of said camera that is mounted, supported, and releasably held by said first means includes a second subassembly which comprises:
   a. a second frame member, essentially rectangular in shape, having weight, a first end, and a second end, wherein said second frame member is positioned in parallel equal spaced-apart relationship to said first frame member of said first subassembly;
   b. and, a counterweight attached to said second frame member at said second end thereof;
      wherein said weight of this said second means equals said weight of said first means and of said camera mounted, supported, and releasably held by said first means.

4. An aerial photography camera mount assembly, as set forth in claim 3, wherein said third means for removably holding said first and second means in parallel, equal spaced-apart relationship, and for detachably interconnecting said first and second means, and also for slidably moving simultaneously said first means and said second means in diametrically opposed directions, includes a third subassembly which comprises:

a. a third frame member, essentially box-like in shape and hollow, having a front vertical surface, a lower horizontal surface connected to said front vertical surface, a rear vertical surface parallel to said front vertical surface and connected to said lower horizontal surface, an upper horizontal surface parallel to said lower horizontal surface and connected to said rear and front vertical surfaces, an open first end, and an open second end;

b. a first transverse horizontal support member attached to and extending beyond said front vertical surface of said third frame member, with this support member having a first and a second end;

c. a first and a second transverse horizontal guide members positioned, respectively, above and below said first transverse horizontal support member, and attached to said front vertical surface of said third frame member, with said first and second transverse horizontal guide members parallel to, and equally spaced-apart from, said first transverse horizontal support member;

d. a second transverse horizontal support member attached to and extending beyond said rear vertical surface of said third frame member, with this support member having a first and second end;

e. a third and a fourth transverse horizontal guide members positioned, respectively, above and below said second transverse horizontal support member, and attached to said rear vertical surface of said third frame member, with said third and fourth transverse horizontal guide members parallel to, and equally spaced-apart from, said second transverse horizontal support member;

f. an upper sprocket rotatably attached to said upper horizontal surface of said third frame member;

g. a lower sprocket rotatably attached to said front vertical surface of said third frame member;

h. an endless chain in engagement with said upper and said lower sprockets;

i. a crank handle rotatably connected to said upper sprocket;

j. a driven shaft having a first and a second end, with said first end rotatably connected to said lower sprocket, and with said second end rotatably connected to said rear vertical surface of said third frame member;

k. a first idler shaft having a first end, a second end, and a first idler pulley therebetween, with said first end rotatably connected to said first end of said first transverse horizontal support member, and with said second end rotatably connected to said first end of said second transverse horizontal support member;

l. a second idler shaft having a first end, a second end, and a second idler pulley therebetween, with said first end rotatably connected to said second end of said first transverse horizontal support member, and with said second end rotatably connected to said second end of said second transverse horizontal support member;

m. a first cable means interconnecting said driven shaft, said first idler pulley on said first idler shaft, and said second end of said first frame member of said first subassembly;

n. a second cable means interconnecting said driven shaft, said second idler pulley on said second idler shaft, and said first end of said second frame member of said second subassembly;

o. a first plurality of roller bars attached, in a vertical position, to said front vertical surface of said third frame member, and internal of said surface, wherein each one of said first plurality of roller bars is identical and comprises two spaced-apart, horizontally disposed rollers rotatably attached to a bar, and wherein at least one of said roller bars is disposed in an inverted condition;

p. a second plurality of roller bars attached, in a vertical position, to said rear vertical surface of said third frame member, and internal of said surface, wherein each one of said second plurality of roller bars is identical to each one of said first plurality, and wherein at least one of said roller bars of said second plurality is disposed in an inverted condition;

q. a first roller support means attached to and disposed above said first end of said first transverse horizontal support member, and also disposed under said first frame member of said first subassembly;

r. and, a second roller support means attached to and disposed below said second end of said first transverse horizontal support member and also disposed under said second transverse horizontal support member.

5. An aerial photography camera mount assembly, as set forth in claim 4, wherein said fourth means for preventing inadvertent jettisoning of said first means, and of said camera releasably held by said first means, and also of said second means, from said helicopter includes a fourth subassembly which comprises:

a. a locking rod having a first end, a second end, and an opening in and through said first end, with said rod positioned vertically and passing through said upper horizontal surface of said third frame member of said third subassembly, and through said first frame member of said first subassembly, near said second end of said first frame member, and also through said second frame member of said second subassembly, near said first end of said second frame member;

b. and, a sixth means for releasably locking said locking rod in place, wherein this said means includes:
 (1) an abutment bar attached to said upper horizontal surface of said third frame member of said third subassembly, with said abutment bar having an opening therein and therethrough in registration with said opening in and through said first end of said locking rod;
 (2) and, a locking pin removably inserted into, and passing through, said openings in and through said locking rod and said abutment bar.

6. An aerial photography camera mount assembly, as set forth in claim 5, which further comprises a seventh means for releasably attaching said third means to some of said first plurality of cargo tiedown rings affixed to said horizontal internal surface of said helicopter, wherein said seventh means includes:

a. a second plurality of cargo tiedown rings affixed to said front vertical surface of said third frame member of said third means;

b. a third plurality of cargo tiedown rings affixed to said rear vertical surface of said third frame member of said third means;
c. a first cargo tiedown strap, of predetermined length and passing through said second plurality of cargo tiedown rings, having a first end and a second end, with said first end releasably connected to one of said first plurality of cargo tiedown rings, and with said second end releasably connected to another one of said first plurality of cargo tiedown rings;
d. and a second cargo tiedown strap, of predetermined length and passing through said third plurality of cargo tiedown rings, with said first end releasably connected to one of said first plurality of cargo tiedown rings, and with said second end releasably connected to another one of said first plurality of cargo tiedown rings.

7. An aerial photography camera mount assembly, as set forth in claim 6, wherein said first subassembly of said first means, said second subassembly of said second means, said third subassembly of said third means, said fourth subassembly of said fourth means, and said third and fourth plurality of cargo tiedown rings of said seventh means are made of metal.

8. An aerial photography camera mount assembly, as set forth in claim 7, wherein:
a. said first plurality of roller bars of said third subassembly of said third means are three in number;
b. said second plurality of roller bars of said third assembly of said third means are three in number;
c. said second plurality of cargo tiedown rings of said seventh means are two in number;
d. and, said third plurality of cargo tiedown rings of said seventh means are two in number.

* * * * *